US012808686B2

(12) United States Patent
Chen et al.

(10) Patent No.: US 12,808,686 B2
(45) Date of Patent: Nov. 24, 2026

(54) VOTING BASED METHOD FOR FUSING MAP DATA FOR A VEHICLE

(71) Applicant: GM Global Technology Operations LLC, Detroit, MI (US)

(72) Inventors: Gui Chen, Sterling Heights, MI (US); Bo Yu, Troy, MI (US); Shuqing Zeng, Sterling Heights, MI (US); Joon Hwang, Pflugerville, TX (US); Mason David Gemar, Cedar Park, TX (US); Fan Bai, Ann Arbor, MI (US); Vivek Vijaya Kumar, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 371 days.

(21) Appl. No.: 18/494,097

(22) Filed: Oct. 25, 2023

(65) Prior Publication Data

US 2025/0137815 A1 May 1, 2025

(51) Int. Cl.
*G01C 21/00* (2006.01)
*G01C 21/30* (2006.01)

(52) U.S. Cl.
CPC ......... *G01C 21/3841* (2020.08); *G01C 21/30* (2013.01); *G01C 21/3815* (2020.08); *G01C 21/3893* (2020.08); *G01C 21/3896* (2020.08)

(58) Field of Classification Search
CPC ............ G01C 21/3815; G01C 21/3819; G01C 21/3822; G01C 21/3841; G01C 21/3867
See application file for complete search history.

(56) References Cited

U.S. PATENT DOCUMENTS

| | | | |
|---|---|---|---|
| 11,326,889 | B2 | 5/2022 | Kim |
| 2004/0114379 | A1 | 6/2004 | Miller et al. |

(Continued)

FOREIGN PATENT DOCUMENTS

| | | | | |
|---|---|---|---|---|
| WO | WO-2011042876 A1 * | 4/2011 | | ............. G08G 1/012 |
| WO | 2019207160 A1 | 10/2019 | | |

OTHER PUBLICATIONS

Zhou, Lane Information Extraction for High Definition Maps Using Crowdsourced Data, Jul. 2023 (Year: 2023).*

(Continued)

*Primary Examiner* — Erin D Bishop
*Assistant Examiner* — Shivam Sharma
(74) *Attorney, Agent, or Firm* — Vivacqua Crane, PLLC

(57) ABSTRACT

A system for resolving discrepancies in map data includes one or more central computers in wireless communication with one or more vehicles. The one or more central computers are programmed to receive a first map dataset and a second map dataset. The one or more central computers are further programmed to receive a plurality of crowdsourced map datasets. Each of the plurality of crowdsourced map datasets represents the predefined geographical area. The one or more central computers are further programmed to compare each of the plurality of crowdsourced map datasets with the first map dataset and the second map dataset to determine one or more common lane lines. The one or more central computers are further programmed to determine a fused map dataset based on the first map dataset, the second map dataset, the plurality of crowdsourced map datasets, and the one or more common lane lines.

17 Claims, 9 Drawing Sheets

(56) References Cited

U.S. PATENT DOCUMENTS

| | | | | |
|---|---|---|---|---|
| 2014/0324339 | A1 | 10/2014 | Adam et al. | |
| 2016/0102986 | A1 | 4/2016 | Ma et al. | |
| 2018/0154901 | A1 | 6/2018 | Hasberg et al. | |
| 2019/0122386 | A1 | 4/2019 | Wheeler et al. | |
| 2019/0154842 | A1 | 5/2019 | Adachi | |
| 2019/0234745 | A1* | 8/2019 | Lee | B60W 40/10 |
| 2020/0249332 | A1 | 8/2020 | Pandey et al. | |
| 2020/0363218 | A1 | 11/2020 | Kim | |
| 2021/0158547 | A1 | 5/2021 | He et al. | |
| 2023/0060542 | A1 | 3/2023 | Friedrich et al. | |

OTHER PUBLICATIONS

Juan, Lane Detection Using Histogram-Based Segmentation and Decision Trees, Oct. 2000 (Year: 2000).*
Chen, G., et al. U.S. Appl. No. 18/171,848, filed Feb. 21, 2023.
Chen, G., et al. U.S. Appl. No. 18/318,247, filed May 16, 2023.
Yu, B., et al. U.S. Appl. No. 18/359,017, filed Jun. 26, 2023.
Yu, B., et al. U.S. Appl. No. 18/364,505, filed Aug. 3, 2023.
Zeng, S., et al. U.S. Appl. No. 18/473,607, filed Sep. 25, 2023.
U.S. Appl. No. 18/171,848, filed Feb. 21, 2023.
U.S. Appl. No. 18/318,247, filed May 16, 2023.
U.S. Appl. No. 18/359,017, filed Jun. 26, 2023.
U.S. Appl. No. 18/364,505, filed Aug. 3, 2023.
U.S. Appl. No. 18/473,607, filed Sep. 25, 2023.
Song, H., et al. "A Lightweight High Definition Mapping Method Based on Multi-Source Data Fusion Perception," Applied Sciences, 2023, vol. 13, pp. 1-17.

* cited by examiner

VOTING BASED METHOD FOR FUSING MAP DATA FOR A VEHICLE

INTRODUCTION

The present disclosure relates to a system and method for resolving discrepancies in map data.

An autonomous vehicle executes various tasks such as, but not limited to, perception, localization, mapping, path planning, decision making, and motion control. Autonomous vehicles rely upon map data for many of the tasks that are executed such as localization, mapping, and path planning. It is to be appreciated that different versions of map data representing the same geographical area may be generated, where each version of the map data is generated from different data sources. One example of a version of map data is crowdsourced map data. Crowdsourced map data is generated based on global positioning system (GPS) data and data collected by vehicles on the road. Some examples of the data collected by the vehicles include image data collected by an on-board camera, vehicle speed, and yaw sensor data. While crowdsourced maps provide real-time information for constructing lane lines as well as clear lane line attributes, crowdsourced maps may face challenges because of calibration issues with the on-board camera. Also, the GPS data may introduce bias and random noise to the crowdsourced map.

Map data based on telemetry data, such as a high-speed vehicle telemetry (HSVT) source, provides a high confidence level and is usually relatively easy to procure. However, telemetry-based map data does not provide lane line attributes such as color and type. Also, telemetry-based map data is determined based on the behavior of individual drivers who operate the vehicles. Aerial map data, which is based on satellite image data, may provide a high degree of precision. However, aerial map data may not consistently provide lane line attributes. Moreover, aerial maps are time-consuming to create, may be outdated depending on when images were collected, and may contain regions that are occluded due to issues such as tree cover. Finally, high-definition map data is generated based on data collected from survey vehicles and may provide a high degree of precision as well as lane line attributes. However, high-definition map data is time-consuming to update.

Thus, while maps for vehicles achieve their intended purpose, there is a need in the art for an improved approach for resolving discrepancies in map data that alleviates the above-mentioned challenges.

SUMMARY

According to several aspects, a system for resolving discrepancies in map data is provided. The system may include one or more central computers in wireless communication with one or more vehicles. The one or more central computers are programmed to receive a first map dataset and a second map dataset. Both the first map dataset and the second map dataset represent a predefined geographical area. The one or more central computers are further programmed to receive a plurality of crowdsourced map datasets. Each of the plurality of crowdsourced map datasets represents the predefined geographical area. The one or more central computers are further programmed to compare each of the plurality of crowdsourced map datasets with the first map dataset and the second map dataset to determine one or more common lane lines. The one or more central computers are further programmed to determine a fused map dataset based at least in part on the first map dataset, the second map dataset, the plurality of crowdsourced map datasets, and the one or more common lane lines.

In another aspect of the present disclosure, the predefined geographical area is a segment of a roadway containing one or more lane lines.

In another aspect of the present disclosure, to compare each of the plurality of crowdsourced map datasets with the first map dataset and the second map dataset, the one or more central computers are further programmed to generate a plurality of aligned map datasets. The plurality of aligned map datasets includes a first subset and a second subset. The first subset is generated by aligning each of the plurality of crowdsourced map datasets with the first map dataset by executing a map-matching registration algorithm. The second subset is generated by aligning each of the plurality of crowdsourced map datasets with the second map dataset by executing the map-matching registration algorithm. To compare each of the plurality of crowdsourced map datasets with the first map dataset and the second map dataset, the one or more central computers are further programmed to determine the one or more common lane lines based at least in part on the plurality of aligned map datasets.

In another aspect of the present disclosure, each of the first map dataset, the second map dataset, and the plurality of crowdsourced map datasets includes a plurality of points representing the one or more lane lines. To execute the map-matching registration algorithm for a first of the plurality of crowdsourced map datasets, the one or more central computers are further programmed to determine a plurality of associated point pairs. A first point of each of the plurality of associated point pairs is one of the plurality of points in the first map dataset, and where a second point of each of the plurality of associated point pairs is one of the plurality of points in the first of the plurality of crowdsourced map datasets. To execute the map-matching registration algorithm for a first of the plurality of crowdsourced map datasets, the one or more central computers are further programmed to apply a transformation to the first of the plurality of crowdsourced map datasets to generate a first aligned map dataset of the first subset of the plurality of aligned map datasets. The transformation is chosen to minimize a lateral offset and a color distance between the first point and the second point of each of the plurality of associated point pairs.

In another aspect of the present disclosure, the lateral offset is a total lateral distance between the first point and the second point of each of the plurality of associated point pairs and the color distance is a total difference in color between the first point and the second point of each of the plurality of associated point pairs.

In another aspect of the present disclosure, to determine the one or more common lane lines, the one or more central computers are further programmed to identify a plurality of detected lane lines. Each of the plurality of detected lane lines is present in at least one of the first map dataset and the second map dataset. To determine the one or more common lane lines, the one or more central computers are further programmed to determine a quantity of votes for each of the plurality of detected lane lines based at least in part on the plurality of detected lane lines, the plurality of crowdsourced map datasets, and the plurality of aligned map datasets. To determine the one or more common lane lines, the one or more central computers are further programmed to determine the one or more common lane lines based at least in part on the quantity of votes for each of the plurality of detected lane lines. The one or more common lane lines includes one or more of the plurality of detected lane lines having greater than or equal to a predetermined quantity of votes.

In another aspect of the present disclosure, to determine the quantity of votes for one of the plurality of detected lane lines, the one or more central computers are further programmed to determine a first quantity of the plurality of crowdsourced map datasets including the one of the plurality of detected lane lines based at least in part on the plurality of aligned map datasets. To determine the quantity of votes for one of the plurality of detected lane lines, the one or more central computers are further programmed to determine the quantity of votes for the one of the plurality of detected lane lines. The quantity of votes is the first quantity.

In another aspect of the present disclosure, to determine the fused map dataset, the one or more central computers are further programmed to generate a first plurality of lateral offset histograms based on the first subset of the plurality of aligned map datasets. Each of the first plurality of lateral offset histograms corresponds to one of the one or more common lane lines. To determine the fused map dataset, the one or more central computers are further programmed to generate a second plurality of lateral offset histograms based on the second subset of the plurality of aligned map datasets. Each of the second plurality of lateral offset histograms corresponds to one of the one or more common lane lines. To determine the fused map dataset, the one or more central computers are further programmed to determine the fused map dataset based at least in part on the first plurality of lateral offset histograms and the second plurality of lateral offset histograms.

In another aspect of the present disclosure, each of the first plurality of lateral offset histograms includes a first plurality of lateral offsets for one of the one or more common lane lines. Each of the first plurality of lateral offsets is determined from one of the first subset of the plurality of aligned map datasets. Each of the second plurality of lateral offset histograms includes a second plurality of lateral offsets for one of the one or more common lane lines, and where each of the second plurality of lateral offsets is determined from one of the second subset of the plurality of aligned map datasets.

In another aspect of the present disclosure, to determine the fused map dataset based at least in part on the first plurality of lateral offset histograms and the second plurality of lateral offset histograms, the one or more central computers are further programmed to calculate a first plurality of probability distribution parameter sets based at least in part on the first plurality of lateral offset histograms. Each of the first plurality of probability distribution parameter sets corresponds to one of the one or more common lane lines. To determine the fused map dataset, the one or more central computers are further programmed to calculate a second plurality of probability distribution parameter sets based at least in part on the second plurality of lateral offset histograms. Each of the second plurality of probability distribution parameter sets corresponds to one of the one or more common lane lines. To determine the fused map dataset, the one or more central computers are further programmed to calculate a plurality of fused point sets based at least in part on the first plurality of probability distribution parameter sets and the second plurality of probability distribution parameter sets. Each of the plurality of fused point sets corresponds to one of the one or more common lane lines. To determine the fused map dataset, the one or more central computers are further programmed to determine the fused map dataset. The fused map dataset includes at least the plurality of fused point sets.

According to several aspects, a method for resolving discrepancies in map data is provided. The method may include comparing each of a plurality of crowdsourced map datasets with a first map dataset and a second map dataset to determine one or more common lane lines using one or more central computers. The plurality of crowdsourced map datasets, the first map dataset, and the second map dataset represent a predefined geographical area, and where each of the plurality of crowdsourced map datasets, the first map dataset, and the second map dataset includes a plurality of points representing one or more lane lines. The method further may include determining a fused map dataset using the one or more central computers based at least in part on the first map dataset, the second map dataset, the plurality of crowdsourced map datasets, and the one or more common lane lines.

In another aspect of the present disclosure, comparing each of the plurality of crowdsourced map datasets with the first map dataset and the second map dataset further may include generating a plurality of aligned map datasets using the one or more central computers. The plurality of aligned map datasets includes a first subset and a second subset. The first subset is generated by aligning each of the plurality of crowdsourced map datasets with the first map dataset by executing a map-matching registration algorithm. The second subset is generated by aligning each of the plurality of crowdsourced map datasets with the second map dataset by executing the map-matching registration algorithm. Comparing each of the plurality of crowdsourced map datasets with the first map dataset and the second map dataset further may include determining the one or more common lane lines using the one or more central computers based at least in part on the plurality of aligned map datasets.

In another aspect of the present disclosure, executing the map-matching registration algorithm for a first of the plurality of crowdsourced map datasets further may include determining a plurality of associated point pairs using the one or more central computers. A first point of each of the plurality of associated point pairs is one of the plurality of points in the first map dataset, and where a second point of each of the plurality of associated point pairs is one of the plurality of points in the first of the plurality of crowdsourced map datasets. Executing the map-matching registration algorithm for a first of the plurality of crowdsourced map datasets further may include applying a transformation to the first of the plurality of crowdsourced map datasets to generate a first aligned map dataset of the first subset of the plurality of aligned map datasets using the one or more central computers. The transformation is chosen to minimize a lateral offset and a color distance between the first point and the second point of each of the plurality of associated point pairs.

In another aspect of the present disclosure, determining the one or more common lane lines further may include identifying a plurality of detected lane lines using the one or more central computers. Each of the plurality of detected lane lines is present in at least one of the first map dataset and the second map dataset. Determining the one or more common lane lines further may include determining a quantity of votes for each of the plurality of detected lane lines based at least in part on the plurality of detected lane lines, the plurality of crowdsourced map datasets, and the plurality of aligned map datasets using the one or more central computers. Determining the one or more common lane lines further may include determining the one or more common lane lines based at least in part on the quantity of votes for each of the plurality of detected lane lines using the one or more central computers. The one or more common lane lines includes one or more of the plurality of detected lane lines having greater than or equal to a predetermined quantity of votes.

In another aspect of the present disclosure, determining the quantity of votes for each of the plurality of detected lane lines further may include determining a first quantity of the plurality of crowdsourced map datasets including the one of the plurality of detected lane lines using the one or more central computers based at least in part on the plurality of aligned map datasets. Determining the quantity of votes for each of the plurality of detected lane lines further may include determining the quantity of votes for the one of the plurality of detected lane lines using the one or more central computers. The quantity of votes is the first quantity.

In another aspect of the present disclosure, determining the fused map dataset further may include generating a first plurality of lateral offset histograms based on the first subset of the plurality of aligned map datasets using the one or more central computers. Each of the first plurality of lateral offset histograms corresponds to one of the one or more common lane lines. Determining the fused map dataset further may include generating a second plurality of lateral offset histograms based on the second subset of the plurality of aligned map datasets using the one or more central computers. Each of the second plurality of lateral offset histograms corresponds to one of the one or more common lane lines. Determining the fused map dataset further may include determining the fused map dataset using the one or more central computers based at least in part on the first plurality of lateral offset histograms and the second plurality of lateral offset histograms.

In another aspect of the present disclosure, determining the fused map dataset further may include calculating a first plurality of probability distribution parameter sets based at least in part on the first plurality of lateral offset histograms using the one or more central computers. Each of the first plurality of probability distribution parameter sets corresponds to one of the one or more common lane lines. Determining the fused map dataset further may include calculating a second plurality of probability distribution parameter sets based at least in part on the second plurality of lateral offset histograms using the one or more central computers. Each of the second plurality of probability distribution parameter sets corresponds to one of the one or more common lane lines. Determining the fused map dataset further may include calculating a plurality of fused point sets based at least in part on the first plurality of probability distribution parameter sets and the second plurality of probability distribution parameter sets using the one or more central computers. Each of the plurality of fused point sets corresponds to one of the one or more common lane lines. Determining the fused map dataset further may include determining the fused map dataset using the one or more central computers. The fused map dataset includes at least the plurality of fused point sets.

According to several aspects, a system for resolving discrepancies in map data is provided. The system may include one or more central computers in wireless communication with one or more vehicles. The one or more central computers are programmed to receive a first map dataset and a second map dataset. Both the first map dataset and the second map dataset represent a predefined geographical area. The predefined geographical area is a segment of a roadway containing one or more lane lines. The one or more central computers are further programmed to receive a plurality of crowdsourced map datasets. Each of the plurality of crowdsourced map datasets represents the predefined geographical area. The one or more central computers are further programmed to generate a plurality of aligned map datasets. The plurality of aligned map datasets includes a first subset and a second subset. The first subset is generated by aligning each of the plurality of crowdsourced map datasets with the first map dataset by executing a map-matching registration algorithm. The second subset is generated by aligning each of the plurality of crowdsourced map datasets with the second map dataset by executing the map-matching registration algorithm. The one or more central computers are further programmed to determine one or more common lane lines based at least in part on the plurality of aligned map datasets. The one or more central computers are further programmed to determine a fused map dataset based at least in part on the first map dataset, the second map dataset, the plurality of crowdsourced map datasets, and the one or more common lane lines.

In another aspect of the present disclosure, to determine the one or more common lane lines, the one or more central computers are further programmed to identify a plurality of detected lane lines. Each of the plurality of detected lane lines is present in at least one of the first map dataset and the second map dataset. To determine the one or more common lane lines, the one or more central computers are further programmed to determine a quantity of votes for each of the plurality of detected lane lines based at least in part on the plurality of detected lane lines, the plurality of crowdsourced map datasets, and the plurality of aligned map datasets. To determine the one or more common lane lines, the one or more central computers are further programmed to determine the one or more common lane lines based at least in part on the quantity of votes for each of the plurality of detected lane lines. The one or more common lane lines includes one or more of the plurality of detected lane lines having greater than or equal to a predetermined quantity of votes.

In another aspect of the present disclosure, to determine the fused map dataset, the one or more central computers are further programmed to generate a first plurality of lateral offset histograms based on the first subset of the plurality of aligned map datasets. Each of the first plurality of lateral offset histograms corresponds to one of the one or more common lane lines. To determine the fused map dataset, the one or more central computers are further programmed to generate a second plurality of lateral offset histograms based on the second subset of the plurality of aligned map datasets. Each of the second plurality of lateral offset histograms corresponds to one of the one or more common lane lines. To determine the fused map dataset, the one or more central computers are further programmed to determine the fused map dataset based at least in part on the first plurality of lateral offset histograms and the second plurality of lateral offset histograms.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Discrepancies between differing sets of map data may need to be resolved in order to ensure accurate and precise map data for use by vehicle systems such as, for example, advanced driver assistance systems (ADAS), automated driving systems (ADS), and/or the like. Known ground truth map data may be used to reconcile differences between map data sets. However, ground truth data may be sparse and resource intensive to obtain. Therefore, the present disclosure provides a new and improved system and method for resolving discrepancies in map data, involving a voting method for identifying common features.

Figure 1:
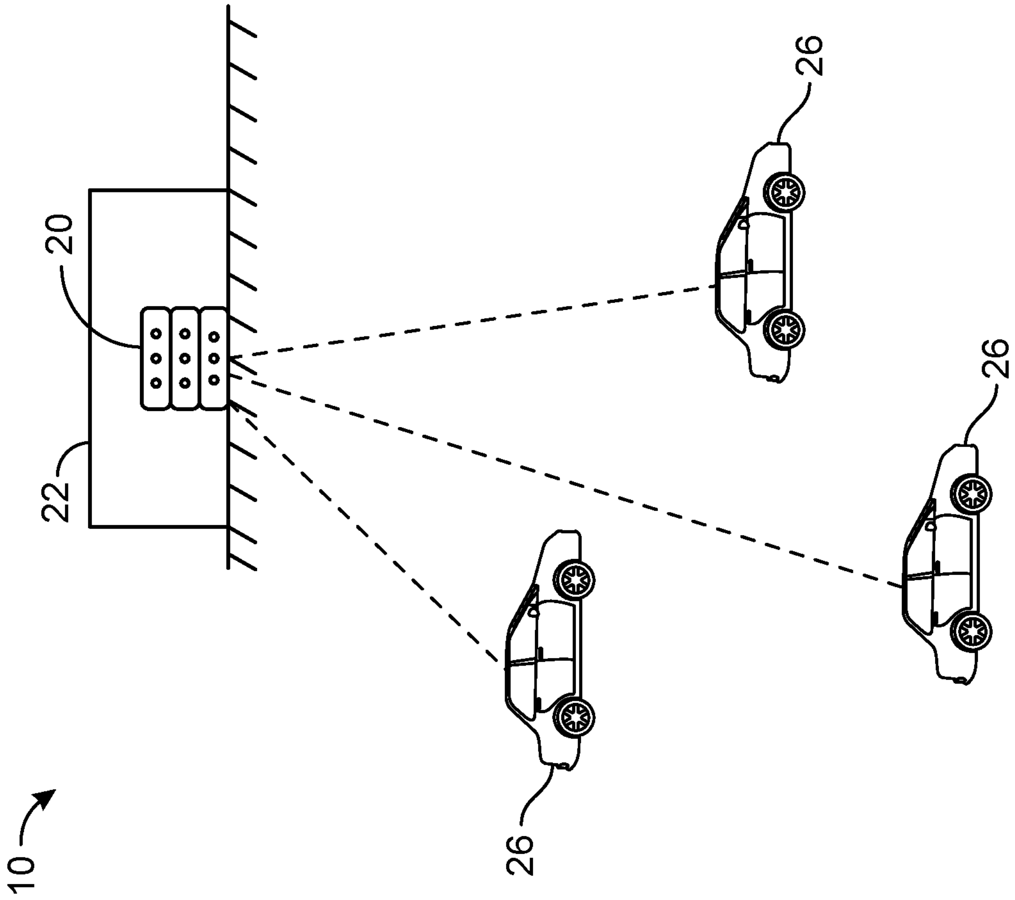
FIG. 1 is a schematic diagram of a system for resolving discrepancies in map data, according to an exemplary embodiment.

Referring to FIG. 1, an exemplary system 10 for resolving discrepancies in map data is illustrated. The system 10 includes one or more central computers 20 located at a back-end office 22, where the one or more central computers 20 are in wireless communication with one or more vehicles 26.

The one or more central computers 20 are used to implement a method 100 for resolving discrepancies in map data, as will be described below. The one or more central computers 20 include at least one processor, a non-transitory computer readable storage device or media, and a central computer communication system.

The processor may be a custom made or commercially available processor, a central processing unit (CPU), a graphics processing unit (GPU), an auxiliary processor among several processors associated with the one or more central computers 20, a semiconductor-based microprocessor (in the form of a microchip or chip set), a macroprocessor, a combination thereof, or generally a device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the one or more central computers 20 to perform the method 100.

The central computer communication system is used by the one or more central computers 20 to communicate with other systems external to the one or more central computers 20 (e.g., to establish the wireless communication between one or more central computers 20 and the one or more vehicles 26). For example, the central computer communication system includes capabilities for communication with vehicles ("V2I" communication). In certain embodiments, the central computer communication system is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the central computer communication system may further include an embedded universal integrated circuit card (eUICC) configured to store at least one cellular connectivity configuration profile, for example, an embedded subscriber identity module (eSIM) profile.

The central computer communication system is further configured to communicate via a personal area network (e.g., BLUETOOTH), near-field communication (NFC), and/or any additional type of radiofrequency communication. Accordingly, the central computer communication system may include one or more antennas and/or communication transceivers for receiving and/or transmitting signals. The central computer communication system is configured to wirelessly communicate information between the one or more vehicles 26 and the one or more central computers 20. Further, the central computer communication system is configured to wirelessly communicate information between the one or more central computers 20 and external communication networks, such as, for example, the internet. It should be understood that the central computer communication system may be integrated with the one or more central computers 20 (e.g., on a same circuit board with the one or more central computers 20 or otherwise a part of the one or more central computers 20) without departing from the scope of the present disclosure.

Figure 2:
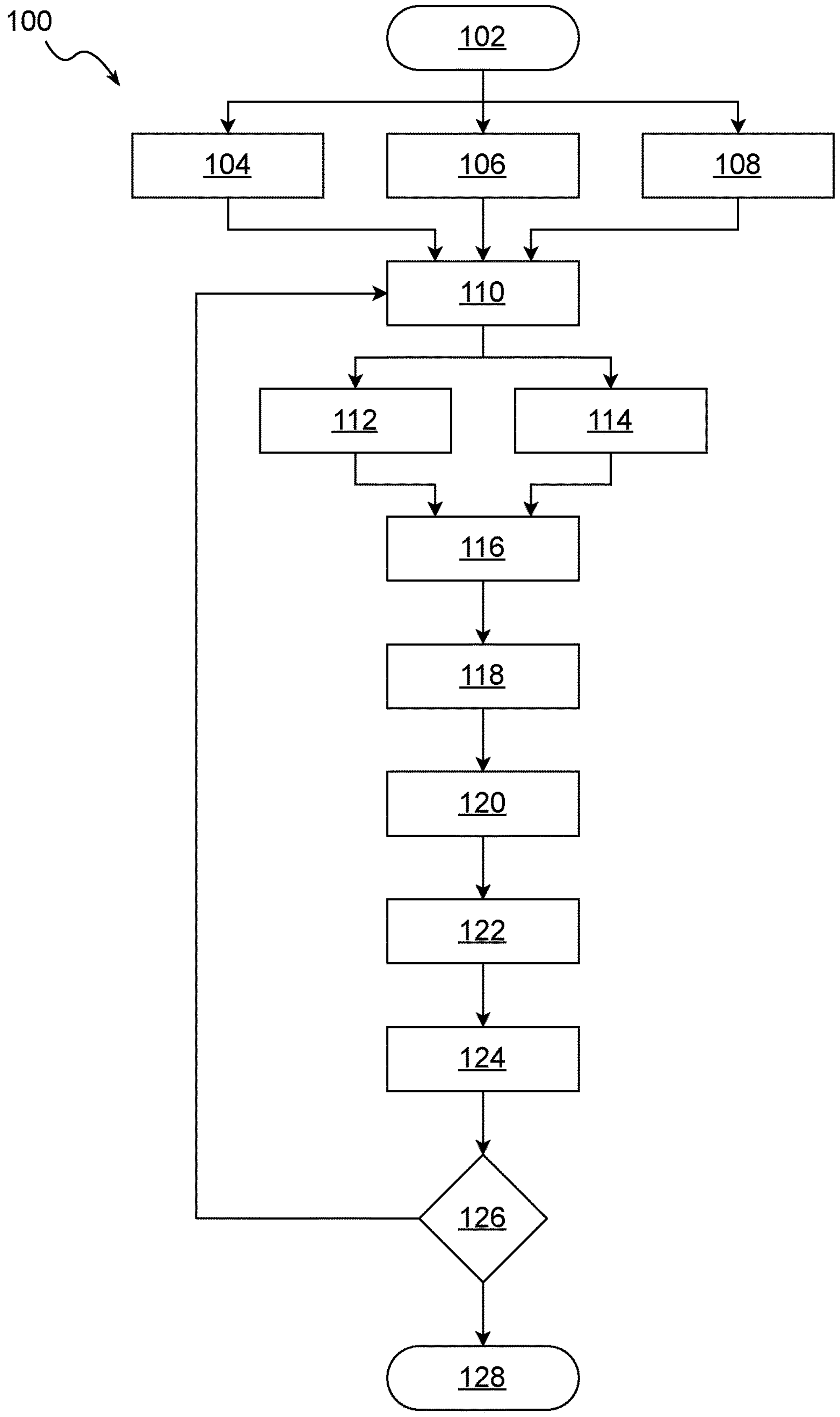
FIG. 2 is a flowchart of a method for resolving discrepancies in map data, according to an exemplary embodiment.

Referring to FIG. 2, a flowchart of the method 100 for resolving discrepancies in map data is shown. The method 100 begins at block 102 and proceeds to blocks 104, 106, and 108. At block 104, the one or more central computers 20 receives a first map dataset. In the scope of the present disclosure, the first map dataset may be obtained from any source, including, for example, global positioning system (GPS) data, image data collected by an on-board camera of a vehicle, a high-speed vehicle telemetry (HSVT) source, aerial and/or satellite image data, and/or data collected from survey vehicles. Some examples of versions of map datasets include, but are not limited to, crowdsourced map data, telemetry-based map data, and aerial map data. After block 104, the method 100 proceeds to block 110, as will be discussed in greater detail below.

At block 106, the one or more central computers 20 receives a second map dataset. In the scope of the present disclosure, the second map dataset may be obtained from any source, including, for example, global positioning system (GPS) data, image data collected by an on-board camera of a vehicle, a high-speed vehicle telemetry (HSVT) source, satellite image data, and/or data collected from survey vehicles. Some examples of versions of map datasets include, but are not limited to, crowdsourced map data, telemetry-based map data, and aerial map data. After block 106, the method 100 proceeds to block 110, as will be discussed in greater detail below.

At block 108, the one or more central computers 20 receives a plurality of crowdsourced map datasets from the one or more vehicles 26 using the central computer communication system. In the scope of the present disclosure, the plurality of crowdsourced map datasets may differ from the first map dataset and the second map dataset due to, for example, variations in equipment precision/accuracy, changes in road conditions since measurement of the first map dataset and the second map dataset, adverse weather conditions during measurement of the first map dataset, the second map dataset, and/or the plurality of crowdsourced map datasets, and/or the like. After block 108, the method 100 proceeds to block 110.

At block 110, the one or more central computers 20 segments the first map dataset received at block 104, the second map dataset received at block 106, and the plurality of crowdsourced map datasets received at block 108 into a plurality of predefined geographical areas.

Figure 3:
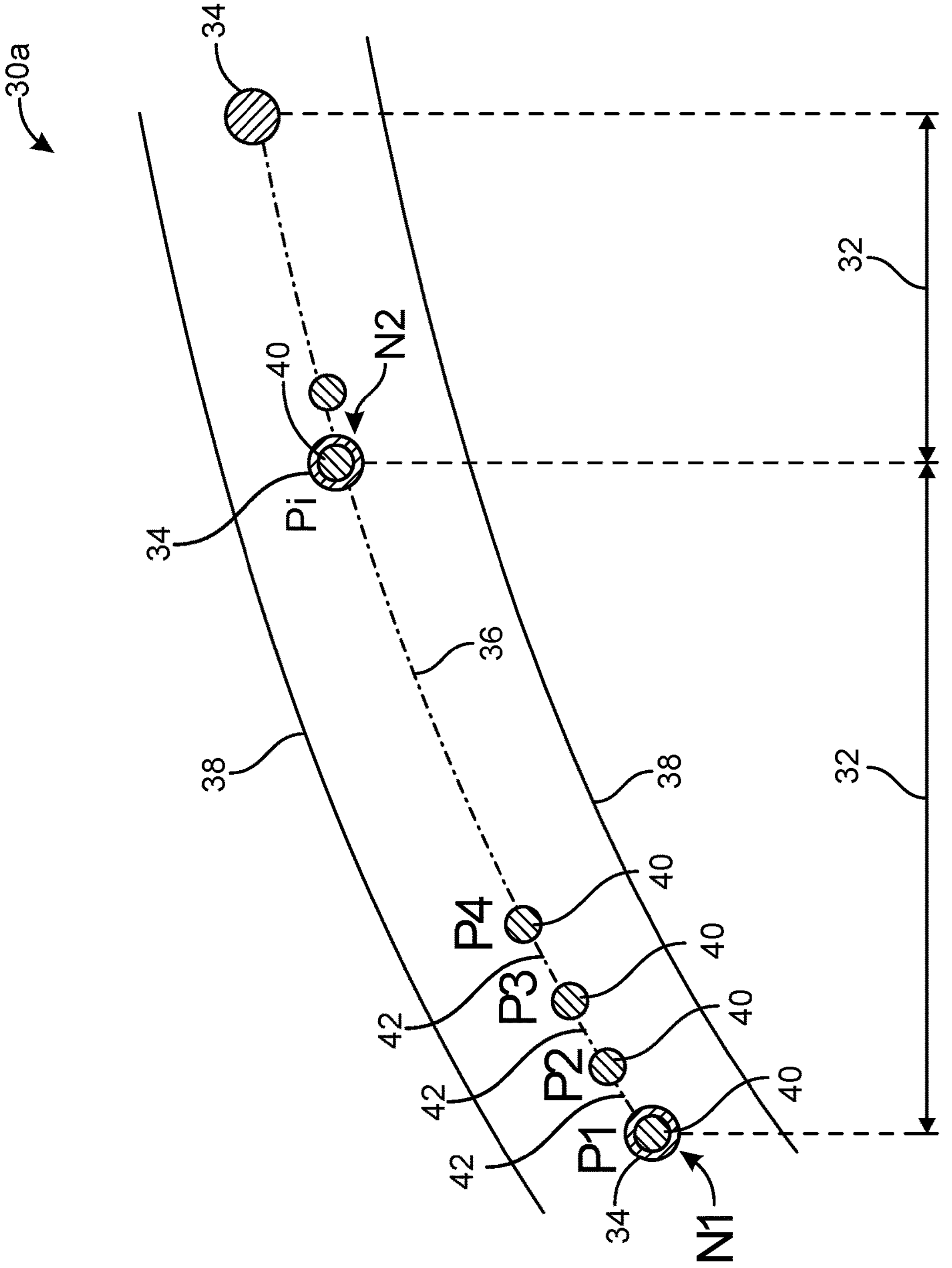
FIG. 3 is an illustration of a portion of a first road network, according to an exemplary embodiment.

Referring to FIG. 3, an exemplary illustration of a portion of a first road network 30*a* is shown. In the scope of the present disclosure, the first road network 30*a* is a graph which models roadways based on a plurality of road segments 32, a plurality of nodes 34, a plurality of line strings 36, and opposing road edges 38. The plurality of nodes 34 each represents an endpoint of one of the road segments 32, where each line string 36 connects two of the plurality of nodes 34 together. It is to be appreciated that the opposing road edges 38 represent theoretical lane or road edges, and not the opposing topological graph edges. The one or more central computers 20 computes a plurality of points 40 that are disposed along the plurality line strings 36. The plurality of points 40 are each positioned at a predetermined distance from one another. The plurality of points 40 divide an individual road segment 32 into segments 42. The predetermined distance represents a perception range of a vehicle that is traveling along the road represented by the first road network 30*a*. In one non-limiting embodiment, the predetermined distance is about fifty meters, however, it is to be appreciated that other dimensions may be used as well.

In an exemplary embodiment, the one or more central computers 20 determine the plurality of points 40 by starting at a first node N1 of an initial road segment 32 and placing a first predetermined point P1 at the first node N1. The one or more central computers 20 then determine a subsequent point P2 at the predetermined distance along the line string 36. The one or more central computers 20 continue to determine the predetermined points [P3, P4 . . . . Pi] for the entire length of the road segment 32. In the event the last point Pi is disposed at a distance less than the predetermined distance from an end node N2 where the road segment 32 terminates, then the length of the last segment 42 is less than the predetermined distance.

Figure 4:
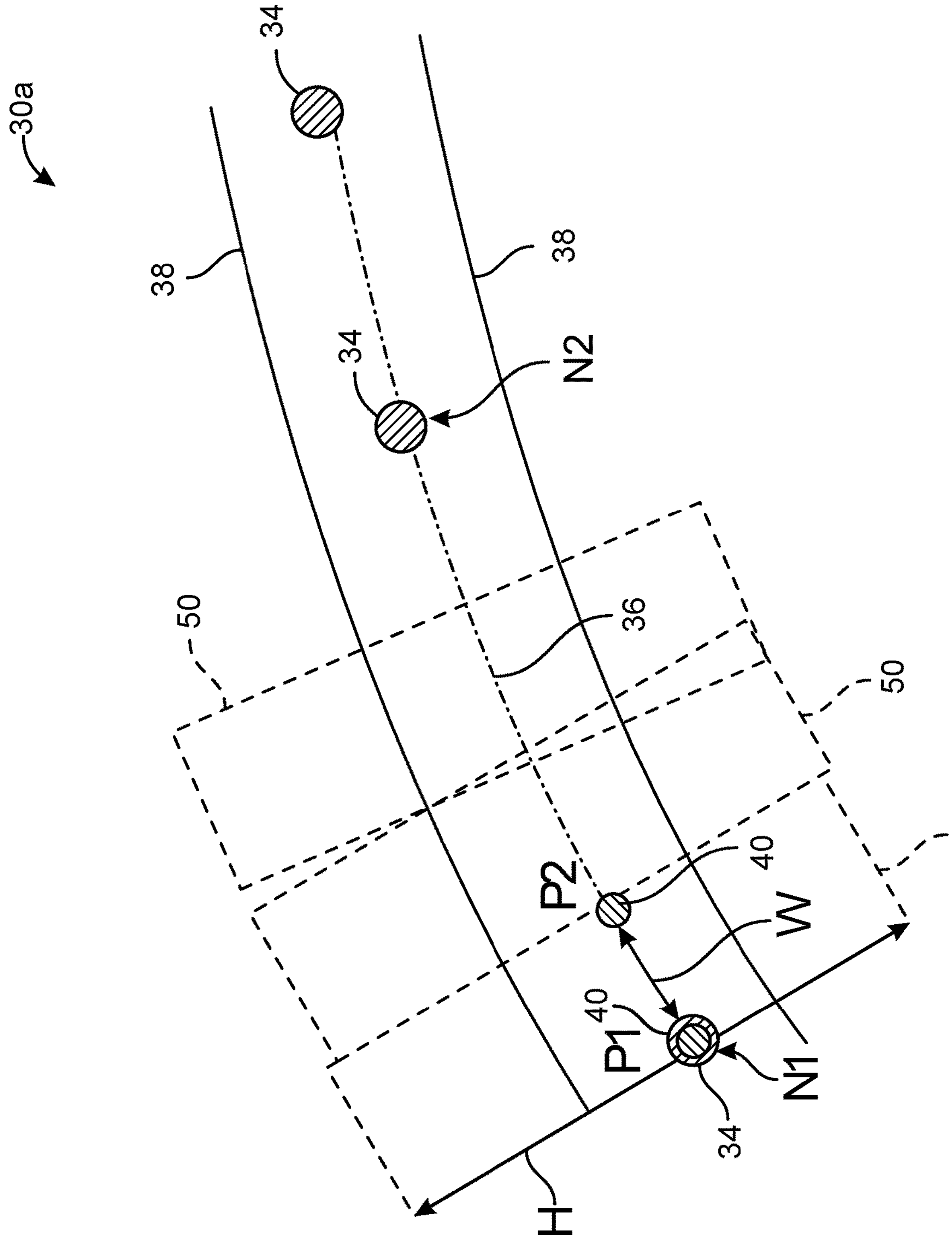
FIG. 4 is an illustration of the portion of the road network of FIG. 3 with bounding boxes, according to an exemplary embodiment.

Referring to FIG. 4, an exemplary illustration of the portion of the first road network 30*a* of FIG. 3 with bounding boxes 50 is shown. In the scope of the present disclosure, the plurality of bounding boxes 50 each represent a single unit for executing the method 100 (i.e., a predefined geographical area), as will be disclosed in greater detail below. Each bounding box 50 includes a lateral dimension that is perpendicular to the road segments 32 (i.e., a width W) and a longitudinal dimension that is aligned with the road segments 32 (i.e., a height H) that correspond to the perception range of a vehicle traveling along the road represented by the first road network 30*a*. Specifically, in the example as shown in FIG. 4, the width W of the bounding box 50 is defined between points P1 and P2, which is the predetermined distance between the plurality of points 40.

Figure 5:
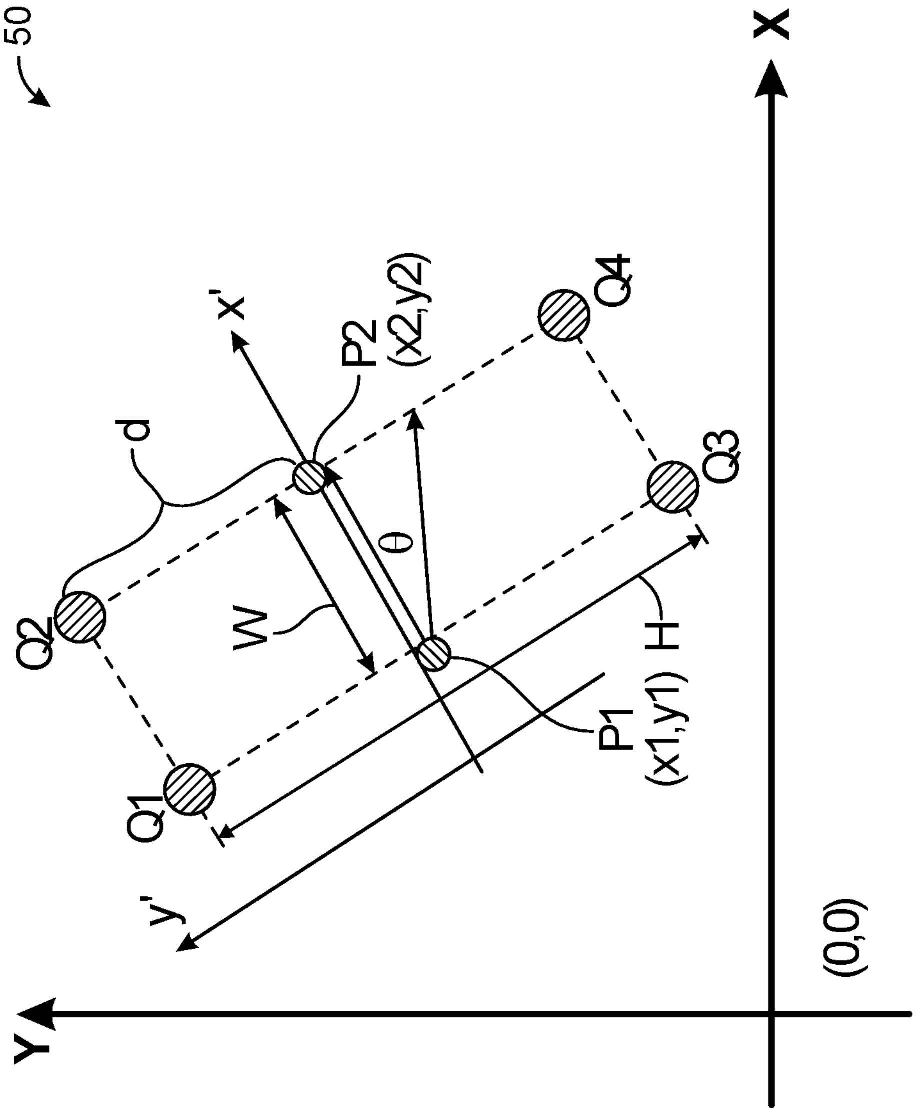
FIG. 5 is an illustration of one of the bounding boxes shown in FIG. 4, according to an exemplary embodiment.

Referring to FIG. 5, one of the bounding boxes 50 shown in FIG. 4 is shown. FIG. 5 illustrates a vehicle coordinate system x'y', where the x'-axis is parallel with respect to the road edges 38 (FIG. 4) and the y'-axis is perpendicular with respect to the road edges 38. The heading angle θ represents a heading angle of a vehicle traveling along the road segment 32 (FIG. 4), the coordinates x1, y1 represent the coordinates of the first point P1, the coordinates x2, y2 represent the coordinates of the second point P2, a distance d represents half the height H of the bounding box 50, and Q1, Q2, Q3, Q4 represent corner points of the bounding box 50. Therefore, to determine the width W and height H of the bounding box 50, the one or more central computers 20 calculate coordinates for each corner point Q1, Q2, Q3, Q4 of the bounding box 50. In the example as shown, coordinates for a left upper corner point Q1 are expressed as Q1=(x1, y1+d), coordinates for a right upper corner point Q2 are expressed as Q2=(x2, y2+d), coordinates for a left lower corner point Q3 are expressed as Q3=(x1, y1−d), and coordinates for a right lower corner point Q4 are expressed as Q4=(x2, y2−d).

In the scope of the present disclosure, each of the bounding boxes 50 are considered to be a predefined geographical area. The method 100 iteratively processes each predefined geographical area (i.e., bounding box 50), as will be discussed in greater detail below. The process for segmenting and determining the bounding boxes 50 is performed on each of the first map dataset received at block 104, the second map dataset received at block 106, and each of the plurality of crowdsourced map datasets received at block 108 such that each bounding box 50 represents a same predefined geographical area across each of the first map dataset, the second map dataset, and each of the plurality of crowdsourced map datasets. In other words, a first bounding box of the first map dataset, first bounding box of the second map dataset, and a first bounding box of each of the plurality of crowdsourced map datasets represents a same physical location in the first road network 30*a*. Referring again to FIG. 2, after block 110, the method 100 proceeds to blocks 112 and 114.

At block 112, the one or more central computers 20 identify a plurality of detected lane lines in the first map dataset received at block 104 and the second map dataset received at block 106. Each of the plurality of detected lane lines is present in at least one of the first map dataset and the second map dataset. In the scope of the present disclosure, a lane line is a marking disposed (e.g., painted) on a roadway to provide information about a location of lanes of travel on the roadway by delineating the boundaries of lanes of travel on the roadway. In an exemplary embodiment, the plurality of detected lane lines is identified in the first map dataset and the second map dataset using a rule-based algorithm, a machine learning algorithm, a computer vision algorithm, and/or the like. After block 112, the method 100 proceeds to block 116, as will be discussed in greater detail below.

At block 114, the one or more central computers 20 generates a plurality of aligned map datasets. The plurality of aligned map datasets includes a first subset and a second subset. The first subset is generated by aligning each of the plurality of crowdsourced map datasets with the first map dataset. The second subset is generated by aligning each of the plurality of crowdsourced map datasets with the second map dataset. In an exemplary embodiment, each of the plurality of crowdsourced map datasets are aligned with the first map dataset and the second map dataset using a map-matching registration algorithm.

Figure 6A:
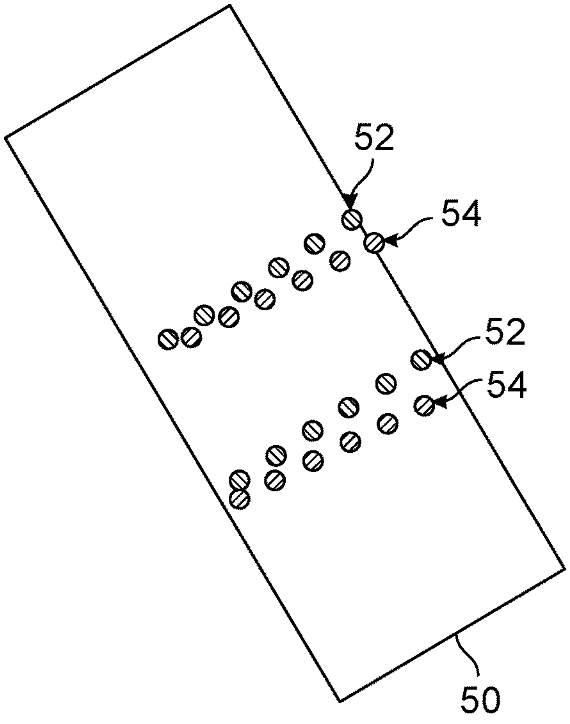
FIG. 6A is an illustration of an exemplary bounding box including a first plurality of points from a first map dataset and a second plurality of points from one of a plurality of crowdsourced map datasets, according to an exemplary embodiment.

Referring to FIG. 6A, an exemplary bounding box 50 including a first plurality of points 52 from the first map dataset and a second plurality of points 54 from one of the plurality of crowdsourced map datasets is shown. The first plurality of points 52 and the second plurality of points 54 represent one or more lane lines. In an exemplary embodiment, the map-matching registration algorithm is an iterative closest point (ICP) algorithm, however, other types of algorithms may be used as well.

The map-matching registration algorithm uses a k-nearest neighbor algorithm to identify sets of closest matched points between each of the first plurality of points 52 and each of the second plurality of points 54, referred to as associated point pairs. Each of the associated point pairs includes a first point and a second point. The first point is one of the first plurality of points 52 and the second point is one of the second plurality of points 54.

Figure 6B:
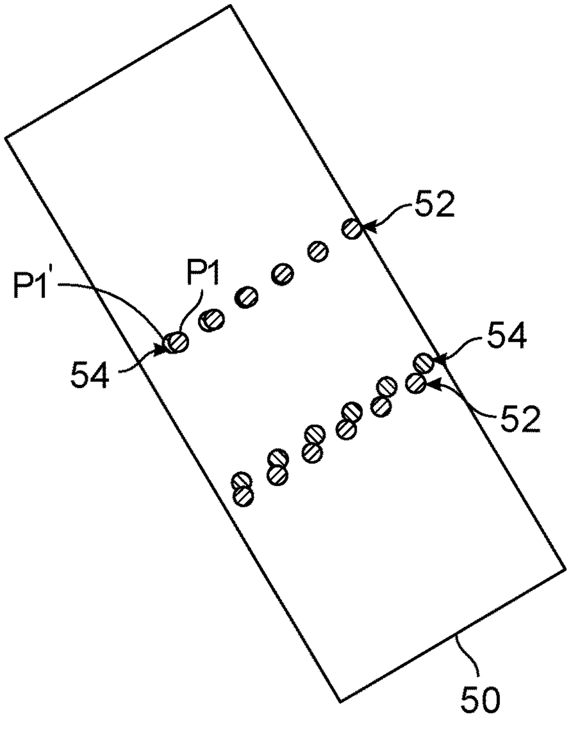
FIG. 6B is an illustration of the exemplary bounding box of FIG. 6A after execution of a map-matching registration algorithm, according to an exemplary embodiment.

Referring to FIG. 6B, an exemplary bounding box 50 including the first plurality of points 52 from the first map dataset and the second plurality of points 54 from one of the plurality of crowdsourced map datasets after execution of the map-matching registration algorithm is shown. As shown in FIG. 6B, point P1 from the first plurality of points 52 and P1' from the second plurality of points 54 represent an associated point pair. The map-matching registration algorithm aligns the first plurality of points 52 and the second plurality of points 54 with one another by applying a transformation (i.e., a translation and/or a rotation) to the second plurality of points 54 to be positioned such as to minimize an objective function. In a non-limiting example, the objective function is:

$$f = \sum_i [d_{c,i} * w_c + d_{g,i} * (1 - w_c)] \quad (1)$$

wherein $f$ is the objective function, $d_{c,i}$ is a color distance for an ith associated point pair of the plurality of associated point pairs, $w_c$ is a color weight, and $d_{g,i}$ is a lateral offset for the ith associated point pair of the plurality of associated point pairs.

The color distance is a discrete binary value (i.e., either zero or one) indicating whether a color of two points in the ith associated point pair of the plurality of associated point pairs is the same (e.g., both yellow, both white, and/or the like). If the color is the same, the color distance is zero. If the color is different, the color distance is one. The color weight is a continuous value between zero and one which adjusts a weighting of the color distance in the objective function (Equation 1). The lateral offset is a lateral distance between the first point and the second point of the ith associated point pair of the plurality of associated point pairs.

It should be understood that the objective function Equation 1 may further include additional factors used to increase matching accuracy between point pairs, including, for example, a line type distance and a line type weight. In an exemplary embodiment, the line type distance is a discrete binary value (i.e., either zero or one) indicating whether a line type (e.g., single line, double line, solid line, dashed line, and/or the like) of two points in the ith associated point pair of the plurality of associated point pairs is the same. If the line type is the same, the line type distance is zero. If the line type is different, the line type distance is one. The line type weight is a continuous value between zero and one which adjusts a weighting of the line type distance in the objective function (Equation 1).

The result of the map-matching registration algorithm is one of the plurality of aligned map datasets, as shown in FIG. 6B. The map-matching registration algorithm is repeated to align each of the plurality of crowdsourced map datasets with the first map dataset and the second map dataset to produce the plurality of aligned map datasets. Referring again to FIG. 2, after block 114, the method 100 proceeds to block 116.

At block 116, the one or more central computers 20 determines a quantity of votes for each of the plurality of detected lane lines identified at block 112. In the scope of the present disclosure, a vote is an indication that a detected lane line is present in one of the plurality of crowdsourced map datasets. In an exemplary embodiment, to determine the quantity of votes for one of the plurality of detected lane lines, the one or more central computers 20 determines a first quantity of the plurality of crowdsourced map datasets including the one of the plurality of detected lane lines. The quantity of votes for the one of the plurality of detected lane lines is considered to be the first quantity of the plurality of crowdsourced map datasets including the one of the plurality of detected lane lines. In a non-limiting example, the plurality of aligned map datasets determined at block 114 are used to identify matching lane lines between the plurality of detected lane lines and the plurality of crowdsourced map datasets. This process is repeated for each of the plurality of detected lane lines to determine the quantity of votes for each of the plurality of detected lane lines. After block 116, the method 100 proceeds to block 118.

At block 118, the one or more central computers 20 determines one or more common lane lines based at least in part on the quantity of votes for each of the plurality of detected lane lines determined at block 116. In an exemplary embodiment, the one or more common lane lines includes one or more of the plurality of detected lane lines having greater than or equal to a predetermined quantity of votes. In a non-limiting example, the predetermined quantity of votes is a simple majority (i.e., fifty percent) of the total votes. It should be understood that the predetermined quantity of votes may be any absolute or relative quantity of votes. After block 118, the method 100 proceeds to block 120.

At block 120, generates a first plurality of lateral offset histograms and a second plurality of lateral offset histograms. Each of the first plurality of lateral offset histograms and the second plurality of lateral offset histograms corresponds to one of the one or more common lane lines determined at block 118.

Each of the first plurality of lateral offset histograms includes a first plurality of lateral offsets for one of the one or more common lane lines. Each of the first plurality of lateral offsets is a sum of the lateral offset for each of the plurality of associated point pairs of the first map dataset and one of the plurality of crowdsourced map datasets corresponding to the one of the one or more common lane lines. Therefore, each of the first plurality of lateral offsets is determined from one of the first subset of the plurality of aligned map datasets.

Each of the second plurality of lateral offset histograms includes a second plurality of lateral offsets for one of the one or more common lane lines. Each of the second plurality of lateral offsets is a sum of the lateral offset for each of the plurality of associated point pairs of the second map dataset and one of the plurality of crowdsourced map datasets corresponding to the one of the one or more common lane lines. Therefore, each of the second plurality of lateral offsets is determined from one of the second subset of the plurality of aligned map datasets.

Figure 7:
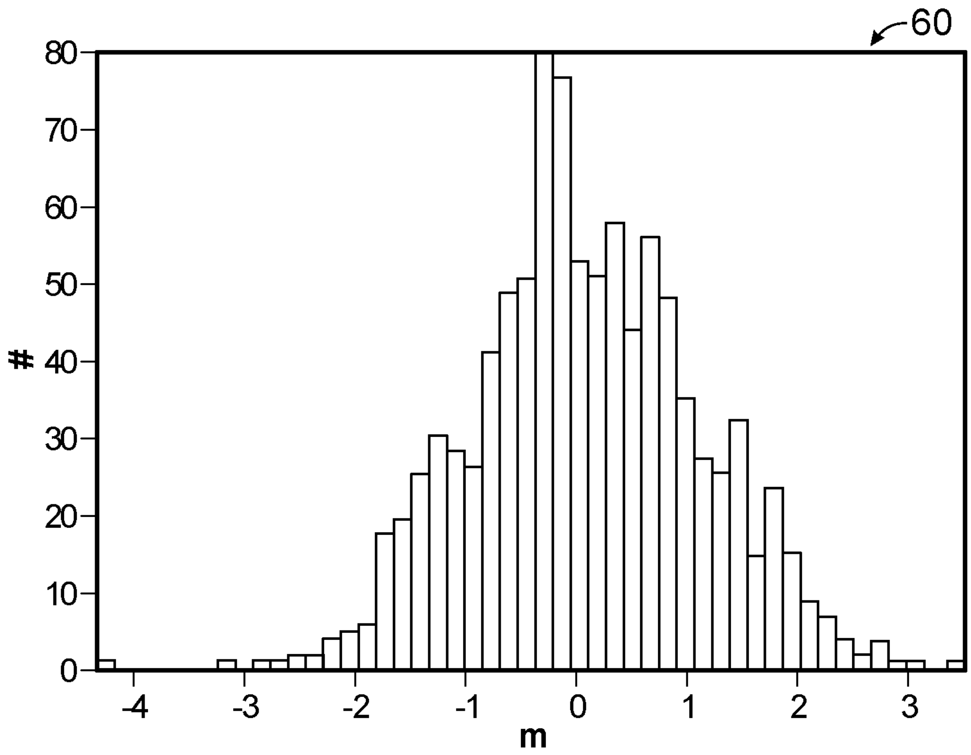
FIG. 7 is an illustration of an exemplary lateral offset histogram, according to an exemplary embodiment.

Referring to FIG. 7, an exemplary lateral offset histogram 60 is shown. An x-axis of the exemplary lateral offset histogram 60 indicates a distance between associated point pairs. A y-axis of the exemplary lateral offset histogram 60 indicates a quantity of lateral offsets having each distance indicated on the x-axis.

Each of the first plurality of lateral offset histograms and the second plurality of lateral offset histograms are also referred to as a sensor noise model. Referring again to FIG. 2., after block 120, the method 100 proceeds to block 122.

At block 122, the one or more central computers 20 calculates a first plurality of probability distribution parameter sets. Each of the first plurality of probability distribution parameter sets corresponds to one of the first plurality of lateral offset histograms generated at block 120. The one or more central computers 20 further calculates a second plurality of probability distribution parameter sets. Each of the second plurality of probability distribution parameter sets corresponds to one of the second plurality of lateral offset histograms generated at block 120.

In an exemplary embodiment, each of the first plurality of probability distribution parameter sets and each of the second plurality of probability distribution parameter sets includes the following, as shown in Equations 2-5:

$$e_h \sim N(\mu_h, \sigma_h) \tag{2}$$

$$e_m \sim N(\mu_m, \sigma_m) \tag{3}$$

$$\rho = \frac{E\{(e_h - \mu_h)(e_m - \mu_m)\}}{\sigma_h \sigma_m} \tag{4}$$

$$\Sigma = \begin{bmatrix} \sigma_h^2 & \rho\sigma_h\sigma_m \\ \rho\sigma_h\sigma_m & \sigma_m^2 \end{bmatrix} \tag{5}$$

wherein $e_h$ is a Gaussian random variable for the first plurality of points 52, $e_m$ is a Gaussian random variable for the second plurality of points 54, $\mu_h$, represents a mean value of the first plurality of lateral offsets, $$\sigma_h^2$$

represents a variance of the first plurality of lateral offsets, $\mu_m$ represents a mean value of the second plurality of lateral offsets, $$\sigma_m^2$$

represents a variance of the second plurality of lateral offsets, ρ represents a correlation coefficient between the first plurality of lateral offsets and the second plurality of lateral offsets, E represents expectation, and Σ represents a covariance matrix between $e_h$ and $e_m$.

In a non-limiting example, the first plurality of probability distribution parameter sets and the second plurality of probability distribution parameter sets are determined using a maximum likelihood estimation algorithm. In the scope of the present disclosure, the maximum likelihood estimation algorithm implements a method of estimating the parameters of a probability distribution (i.e., the first plurality of lateral offset histograms and the second plurality of lateral offset histograms), given some observed data (i.e., the first plurality of lateral offsets and the second plurality of lateral offsets). After block 122, the method 100 proceeds to block 124.

At block 124, the one or more central computers 20 determines a fused map dataset. In the scope of the present disclosure, the fused map dataset is a fusion of the first map dataset and the second map dataset based at least in part on the plurality of crowdsourced map datasets. The fused map dataset includes a plurality of fused point sets. Each of the plurality of fused point sets corresponds to one of the one or more common lane lines.

Figure 8:
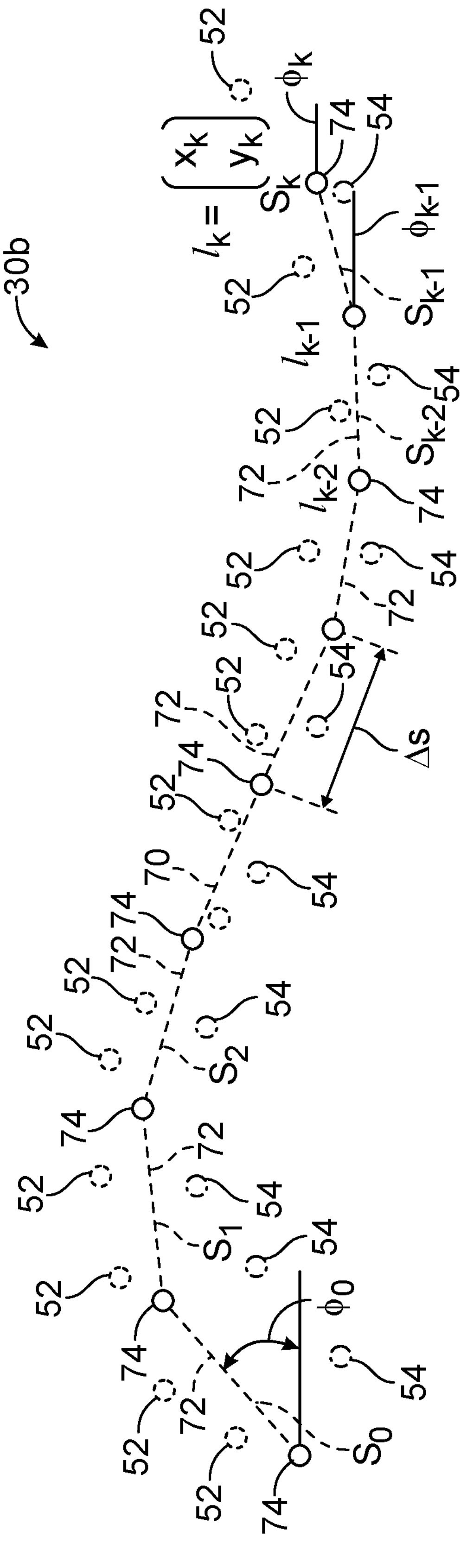
FIG. 8 is an illustration of a portion of a second road network, according to an exemplary embodiment.

Referring to FIG. 8, an exemplary illustration of a portion of a second road network **30*b* is shown. It should be understood that the second road network 30*b* is shown merely for illustration of the determination of the fused map dataset, and that the principles explained below are equally applicable to the first road network 30*a*. The second road network 30*b* includes a discrete random curve 70 that represents the lane lines disposed along the roadway. The discrete random curve 70 is defined by a series of discrete arc segments 72 that are connected by a plurality of nodes 74 and includes a plurality of state vectors $s_k$ where k represents a total number of state vectors $s_k$, and k=1, . . . , N and N denotes the total number of state vectors $s_k$ plus one. The discrete random curve 70 is a polyline or a Markovian random curve, where only state vectors $s_k$ positioned consecutively with respect to one another are correlated to one another. The series of state vectors $s_k$ define a step Δs, where the step Δs represents a distance between two consecutive state vectors $s_k$ that are positioned directly adjacent to one another along the discrete random curve 70** and represents a spatial equivalent of the standard time series Δt of Kalman filtering.

Each node 74 is positioned between two consecutive state vectors $s_k$. The state vectors $s_k$ are two-dimensional vectors that are defined by state variables $l_k$, $\phi_k$, where $l_k$ represents a position of a respective state vector $s_k$, which is expressed in Cartesian coordinates ($x_k$, $y_k$) and $\phi_k$ represents a tangent angle of a respective state vector $s_k$. As explained below, one or more central computers 20 estimate the position $l_i$ and the tangent angle $\phi_i$ for each state vector $s_k$, where the position $l_i$ and the tangent angle $\phi_i$ for each state vector $s_k$ represents a fused point of the fused map dataset. As seen in FIG. 8, the first plurality of points 52 and the second plurality of points 54 are also superimposed on the road network.

Figure 9:
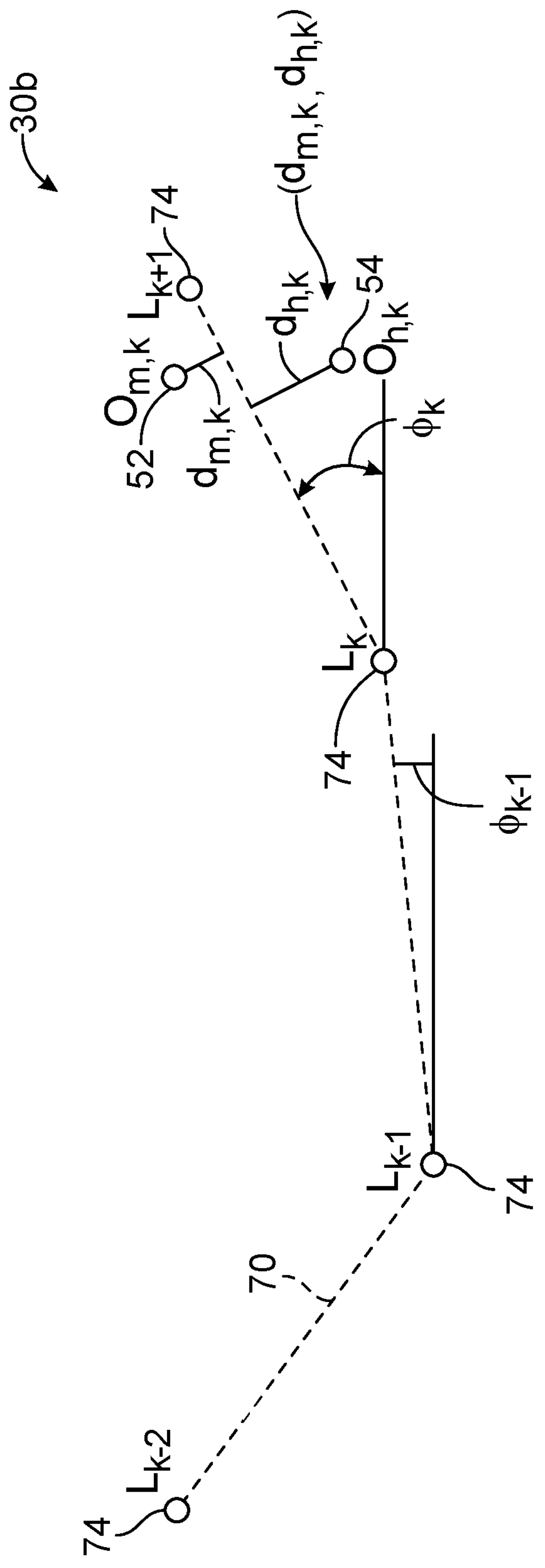
FIG. 9 is an enlarged view of a portion of the second road network shown in FIG. 8.

The first plurality of points 52 are part of a first line curve M(s), where each of the first plurality of points 52 are expressed as first series points $o_{m,k}=M(s_k)$ for k=1, . . . , N and the second plurality of points 54 are part of a second line curve H(s), where each of the second plurality of points 54 are expressed as second series points $o_{h,k}=H(s_k)$ for k=0, . . . , N. Referring to FIG. 9, an enlarged view of a portion of the discrete random curve 70 shown in FIG. 8 starting at the state vector $s_{k-2}$ and terminating at state vector $s_{k+1}$ is shown. Referring to FIGS. 8 and 9, a random variable $L_k$ (FIG. 4) corresponds to each node 74 of the discrete random curve 70 and denotes a realization value of the position $l_k$ of each state vector $s_k$. The one or more central computers 20 determine the lateral offset $d_i$ between a respective point of the first plurality of points 52 $o_{m,i}$ and a respective point of the second plurality of points 54 $o_{h,i}$, where the lateral offset $d_i$ includes a first perpendicular distance $d_{m,k}$ measured from the respective point of the first plurality of points 52 $o_{m,k}$ to the discrete random curve 70 and a second perpendicular distance $d_{h,k}$ measured from the respective point of the second plurality of points 54 $o_{h,k}$, or $d_i=(d_{m,k}, d_{h,k})$ to the discrete random curve 70.

The one or more central computers 20 determines the lateral offset $d_i$ and estimates the position $l_k$ for the k number of state vectors $s_k$ that are part of the discrete random curve 70 based on the lateral offset $d_i$ and the tangent angle $\phi_k$ by minimizing a spatial Kalman filter cost function. It is to be appreciated that the spatial Kalman cost function represents an objective solution that results in determining the best fit solution for estimating the position $l_k$. It is to be appreciated that because the step $\Delta s$ of the discrete random curve 70 represents a spatial equivalent of the standard time series $\Delta t$, a spatial Kalman filtering technique is employed to fuse the first map dataset and the second map dataset together to create the fused map dataset. The spatial Kalman filter cost function is expressed in Equation 6 as:

$$\hat{l}_{1:k} = \min_{\hat{l}_{1:k}} \sum_{i=1}^{k} (d_i - \mu_v)^T \Sigma^{-1} (d_i - \mu_v) + \frac{|\phi_i - \phi_{i-1}|^2}{q_u^2} \tag{6}$$

where $\hat{l}_{1:k}$ represents an estimated position of the respective state vector $s_k$, $\mu_v$ represents the mean of measurement noise, $\phi_i$ represents a tangent angle of a respective state vector $s_k$, $q_u$ represents the variance of additive white Gaussian noise, and $\Sigma$ represents the covariance matrix between $e_h$ and $e_m$, as discussed above. In a non-limiting example, the mean of the measurement noise $\mu_v$ is determined based on the mean value of the first plurality of lateral offsets $\mu_h$ and the mean value of the second plurality of lateral offsets $\mu_m$.

It is to be appreciated that the spatial Kalman filter cost function filters the state vectors $s_k$ by forward recursion through the discrete random curve 70 (FIG. 8). The one or more central computers 20 determines the state vectors $s_k$. The one or more central computers 20 then executes a Kalman smoothing function upon the state vectors $s_k$ by backward recursion through the discrete random curve 70, where the backward recursion includes the most recent state vectors $s_k$. The Kalman smoothing function is expressed in Equation 7 as:

$$\hat{l}_{1:N} = \min_{\hat{l}_{1:N}} \sum_{i=1}^{N} (d_i - \mu_v)^T \Sigma^{-1} (d_i - \mu_v) + \frac{|\phi_i - \phi_{i-1}|^2}{q_u^2} \tag{7}$$

where $\hat{l}_{1:N}$ represents an estimated position of the respective state vector $s_k$, the Kalman smoothening function estimates the position $l_k$ and the tangent angle $\phi_x$ for the N number of state vectors $s_k$ that are part of the discrete random curve 70, where the state vectors $s_k$ each represent a fused point of the fused map dataset.

It is to be appreciated that the cost of performing the Kalman smoothening function as described in Equation 7 increases cubically with the size of the k number of state vectors $s_k$, and it is required to execute the Kalman smoothing function each time the one or more central computers 20 detects a data point representing a new state vector $s_k$ that is introduced to the discrete random curve 70 (FIG. 8). Therefore, one or more central computers 20 estimates an updated state vector $s_k$ in response to introducing a new state vector $s_k$ to the discrete random curve 70, where the updated state vector $\hat{s}_k$ indicates respective values for the position $l_k$ and the tangent angle $\phi_k$ of the new data point. The updated state vector $\hat{s}_k$ is expressed in Equation 8 as:

$$\hat{s}_k = \text{argmin}_{s_k} (d_k - \mu_v)^T \sum v^{-1} (d_k - \mu_v) + (s_k - \tilde{s}_k)^T \tilde{P}_k^{-1} (s_k - \tilde{s}_k) \tag{8}$$

where $\tilde{s}_k$ represents a predicted state, $d_k$ represents a matrix indicating the lateral offset and a longitudinal distance for a respective point of the first plurality of points 52 and the lateral offset and a longitudinal distance for a respective point of the second plurality of points 54, and $$\tilde{P}_k^{-1}$$

represents a covariance matrix.

In summary, the fused map dataset includes only the one or more common lane lines. The location of the one or more common lane lines in the fused map dataset is determined based on statistical analysis of differences between the first map dataset, the second map dataset, and the plurality of crowdsourced map datasets. After block 124, the method 100 proceeds to block 126.

At block 126, the one or more central computers 20 determines whether each of the bounding boxes 50 (i.e., predefined geographical areas) segmented at block 110 has been processed by the method 100. If each of the bounding boxes 50 has not been processed, the method 100 returns to block 110 to select another bounding box 50. If each of the bounding boxes 50 has been processed, the method 100 proceeds to enter a standby state at block 128.

In an exemplary embodiment, the one or more central computers 20 repeatedly exits the standby state 128 and restarts the method 100 at block 102. In a non-limiting example, the one or more central computers 20 exits the standby state 128 and restarts the method 100 on a timer, for example, every three hundred milliseconds.

The system and method of the present disclosure offer several advantages. By identifying the common lane lines using the voting method described above, discrepancies between the first map dataset and the second map dataset are resolved based on the plurality of crowdsourced map datasets. Furthermore, the method presented herein for calculating the sensor noise model (i.e., the lateral offset histogram) for each of the bounding boxes 50 is scalable to large road networks, without dependency on ground truth data. The fused map dataset is distributed to the one or more vehicles 26 to improve the operation of advanced driver assistance systems (ADAS), automated driving systems (ADS), and/or the like.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for resolving discrepancies in map data, the system comprising:

one or more central computers in wireless communication with one or more vehicles, and wherein the one or more central computers are programmed to:

receive a first map dataset and a second map dataset, wherein both the first map dataset and the second map dataset represent a predefined geographical area;

receive a plurality of crowdsourced map datasets, wherein each of the plurality of crowdsourced map datasets represents the predefined geographical area;

compare each of the plurality of crowdsourced map datasets with the first map dataset and the second map dataset to determine one or more common lane lines, wherein to compare each of the plurality of crowdsourced map datasets with the first map dataset and the second map dataset, the one or more central computers are further programmed to:

generate a plurality of aligned map datasets, wherein the plurality of aligned map datasets includes a first subset and a second subset, wherein the first subset is generated by aligning each of the plurality of crowdsourced map datasets with the first map dataset by executing a map-matching registration algorithm, and wherein the second subset is generated by aligning each of the plurality of crowdsourced map datasets with the second map dataset by executing the map-matching registration algorithm; and determine the one or more common lane lines based at least in part on the plurality of aligned map datasets, wherein to determine the one or more common lane lines, the one or more central computers are further programmed to:

identify a plurality of detected lane lines, wherein each of the plurality of detected lane lines is present in at least one of the first map dataset and the second map dataset;

determine a quantity of votes for each of the plurality of detected lane lines based at least in part on the plurality of detected lane lines, the plurality of crowdsourced map datasets, and the plurality of aligned map datasets, wherein a vote is an indication that a detected lane line is present in one of the plurality of crowdsourced map datasets; and determine the one or more common lane lines based at least in part on the quantity of votes for each of the plurality of detected lane lines, wherein the one or more common lane lines includes one or more of the plurality of detected lane lines having greater than or equal to a predetermined quantity of votes; and determine a fused map dataset based at least in part on the first map dataset, the second map dataset, the plurality of crowdsourced map datasets, and the one or more common lane lines.

2. The system of claim 1, wherein the predefined geographical area is a segment of a roadway containing one or more lane lines.

3. The system of claim 1, wherein each of the first map dataset, the second map dataset, and the plurality of crowdsourced map datasets includes a plurality of points representing the one or more lane lines, and wherein to execute the map-matching registration algorithm for a first of the plurality of crowdsourced map datasets, the one or more central computers are further programmed to:

determine a plurality of associated point pairs, wherein a first point of each of the plurality of associated point pairs is one of the plurality of points in the first map dataset, and wherein a second point of each of the plurality of associated point pairs is one of the plurality of points in the first of the plurality of crowdsourced map datasets; and apply a transformation to the first of the plurality of crowdsourced map datasets to generate a first aligned map dataset of the first subset of the plurality of aligned map datasets, wherein the transformation is chosen to minimize a lateral offset and a color distance between the first point and the second point of each of the plurality of associated point pairs.

4. The system of claim 3, wherein the lateral offset is a total lateral distance between the first point and the second point of each of the plurality of associated point pairs and the color distance is a total difference in color between the first point and the second point of each of the plurality of associated point pairs.

5. The system of claim 4, wherein to apply the transformation, the one or more central computers are further programmed to:

apply the transformation to minimize an objective function:

$$f = \sum_i [d_{c,i} * w_c + d_{g,i} * (1 - w_c)]$$

wherein $f$ is the objective function, $d_{c,i}$ is the color distance between the first point and the second point of each of the plurality of associated point pairs, $w_c$ is a color weight, and $d_{g,i}$ is the lateral offset between the first point and the second point of each of the plurality of associated point pairs.

6. The system of claim 3, wherein to determine the fused map dataset, the one or more central computers are further programmed to:

generate a first plurality of lateral offset histograms based on the first subset of the plurality of aligned map datasets, wherein each of the first plurality of lateral offset histograms corresponds to one of the one or more common lane lines;

generate a second plurality of lateral offset histograms based on the second subset of the plurality of aligned map datasets, wherein each of the second plurality of lateral offset histograms corresponds to one of the one or more common lane lines; and determine the fused map dataset based at least in part on the first plurality of lateral offset histograms and the second plurality of lateral offset histograms.

7. The system of claim 6, wherein each of the first plurality of lateral offset histograms includes a first plurality of lateral offsets for one of the one or more common lane lines, wherein each of the first plurality of lateral offsets is determined from one of the first subset of the plurality of aligned map datasets, wherein each of the second plurality of lateral offset histograms includes a second plurality of lateral offsets for one of the one or more common lane lines, and wherein each of the second plurality of lateral offsets is determined from one of the second subset of the plurality of aligned map datasets.

8. The system of claim 6, wherein to determine the fused map dataset based at least in part on the first plurality of lateral offset histograms and the second plurality of lateral offset histograms, the one or more central computers are further programmed to:

calculate a first plurality of probability distribution parameter sets based at least in part on the first plurality of lateral offset histograms, wherein each of the first plurality of probability distribution parameter sets corresponds to one of the one or more common lane lines;

calculate a second plurality of probability distribution parameter sets based at least in part on the second plurality of lateral offset histograms, wherein each of the second plurality of probability distribution parameter sets corresponds to one of the one or more common lane lines;

calculate a plurality of fused point sets based at least in part on the first plurality of probability distribution parameter sets and the second plurality of probability distribution parameter sets, wherein each of the plurality of fused point sets corresponds to one of the one or more common lane lines; and determine the fused map dataset, wherein the fused map dataset includes at least the plurality of fused point sets.

9. The system of claim 1, wherein to determine the quantity of votes for one of the plurality of detected lane lines, the one or more central computers are further programmed to:

determine a first quantity of the plurality of crowdsourced map datasets including the one of the plurality of detected lane lines based at least in part on the plurality of aligned map datasets; and determine the quantity of votes for the one of the plurality of detected lane lines, wherein the quantity of votes is the first quantity.

10. A method for resolving discrepancies in map data, the method comprising:

comparing each of a plurality of crowdsourced map datasets with a first map dataset and a second map dataset to determine one or more common lane lines using one or more central computers, wherein the plurality of crowdsourced map datasets, the first map dataset, and the second map dataset represent a predefined geographical area, wherein each of the plurality of crowdsourced map datasets, the first map dataset, and the second map dataset includes a plurality of points representing one or more lane lines, and wherein comparing each of the plurality of crowdsourced map datasets with the first map dataset and the second map dataset further comprises:

generating a plurality of aligned map datasets using the one or more central computers, wherein the plurality of aligned map datasets includes a first subset and a second subset, wherein the first subset is generated by aligning each of the plurality of crowdsourced map datasets with the first map dataset by executing a map-matching registration algorithm, and wherein the second subset is generated by aligning each of the plurality of crowdsourced map datasets with the second map dataset by executing the map-matching registration algorithm; and determining the one or more common lane lines using the one or more central computers based at least in part on the plurality of aligned map datasets; and determining a fused map dataset using the one or more central computers based at least in part on the first map dataset, the second map dataset, the plurality of crowdsourced map datasets, and the one or more common lane lines.

11. The method of claim 10, wherein executing the map-matching registration algorithm for a first of the plurality of crowdsourced map datasets further comprises:

determining a plurality of associated point pairs using the one or more central computers, wherein a first point of each of the plurality of associated point pairs is one of the plurality of points in the first map dataset, and wherein a second point of each of the plurality of associated point pairs is one of the plurality of points in the first of the plurality of crowdsourced map datasets; and applying a transformation to the first of the plurality of crowdsourced map datasets to generate a first aligned map dataset of the first subset of the plurality of aligned map datasets using the one or more central computers, wherein the transformation is chosen to minimize a lateral offset and a color distance between the first point and the second point of each of the plurality of associated point pairs.

12. The method of claim 11, wherein determining the one or more common lane lines further comprises:

identifying a plurality of detected lane lines using the one or more central computers, wherein each of the plurality of detected lane lines is present in at least one of the first map dataset and the second map dataset;

determining a quantity of votes for each of the plurality of detected lane lines based at least in part on the plurality of detected lane lines, the plurality of crowdsourced map datasets, and the plurality of aligned map datasets using the one or more central computers; and determining the one or more common lane lines based at least in part on the quantity of votes for each of the plurality of detected lane lines using the one or more central computers, wherein the one or more common lane lines includes one or more of the plurality of detected lane lines having greater than or equal to a predetermined quantity of votes.

13. The method of claim 12, wherein determining the quantity of votes for each of the plurality of detected lane lines further comprises:

determining a first quantity of the plurality of crowdsourced map datasets including the one of the plurality of detected lane lines using the one or more central computers based at least in part on the plurality of aligned map datasets; and determining the quantity of votes for the one of the plurality of detected lane lines using the one or more central computers, wherein the quantity of votes is the first quantity.

14. The method of claim 13, wherein determining the fused map dataset further comprises:

generating a first plurality of lateral offset histograms based on the first subset of the plurality of aligned map datasets using the one or more central computers, wherein each of the first plurality of lateral offset histograms corresponds to one of the one or more common lane lines;

generating a second plurality of lateral offset histograms based on the second subset of the plurality of aligned map datasets using the one or more central computers, wherein each of the second plurality of lateral offset histograms corresponds to one of the one or more common lane lines; and determining the fused map dataset using the one or more central computers based at least in part on the first plurality of lateral offset histograms and the second plurality of lateral offset histograms.

15. The method of claim 14, wherein determining the fused map dataset further comprises:

calculating a first plurality of probability distribution parameter sets based at least in part on the first plurality of lateral offset histograms using the one or more central computers, wherein each of the first plurality of probability distribution parameter sets corresponds to one of the one or more common lane lines;

calculating a second plurality of probability distribution parameter sets based at least in part on the second plurality of lateral offset histograms using the one or more central computers, wherein each of the second plurality of probability distribution parameter sets corresponds to one of the one or more common lane lines;

calculating a plurality of fused point sets based at least in part on the first plurality of probability distribution parameter sets and the second plurality of probability distribution parameter sets using the one or more central computers, wherein each of the plurality of fused point sets corresponds to one of the one or more common lane lines; and determining the fused map dataset using the one or more central computers, wherein the fused map dataset includes at least the plurality of fused point sets.

16. A system for resolving discrepancies in map data, the system comprising:

one or more central computers in wireless communication with one or more vehicles, wherein the one or more central computers are programmed to:

receive a first map dataset and a second map dataset, wherein both the first map dataset and the second map dataset represent a predefined geographical area, and wherein the predefined geographical area is a segment of a roadway containing one or more lane lines;

receive a plurality of crowdsourced map datasets, wherein each of the plurality of crowdsourced map datasets represents the predefined geographical area;

generate a plurality of aligned map datasets, wherein the plurality of aligned map datasets includes a first subset and a second subset, wherein the first subset is generated by aligning each of the plurality of crowdsourced map datasets with the first map dataset by executing a map-matching registration algorithm, and wherein the second subset is generated by aligning each of the plurality of crowdsourced map datasets with the second map dataset by executing the map-matching registration algorithm;

determine one or more common lane lines based at least in part on the plurality of aligned map datasets, wherein to determine the one or more common lane lines, the one or more central computers are further programmed to:

identify a plurality of detected lane lines, wherein each of the plurality of detected lane lines is present in at least one of the first map dataset and the second map dataset;

determine a quantity of votes for each of the plurality of detected lane lines based at least in part on the plurality of detected lane lines, the plurality of crowdsourced map datasets, and the plurality of aligned map datasets, wherein a vote is an indication that a detected lane line is present in one of the plurality of crowdsourced map datasets; and determine the one or more common lane lines based at least in part on the quantity of votes for each of the plurality of detected lane lines, wherein the one or more common lane lines includes one or more of the plurality of detected lane lines having greater than or equal to a predetermined quantity of votes; and determine a fused map dataset based at least in part on the first map dataset, the second map dataset, the plurality of crowdsourced map datasets, and the one or more common lane lines.

17. The system of claim 16, wherein to determine the fused map dataset, the one or more central computers are further programmed to:

generate a first plurality of lateral offset histograms based on the first subset of the plurality of aligned map datasets, wherein each of the first plurality of lateral offset histograms corresponds to one of the one or more common lane lines;

generate a second plurality of lateral offset histograms based on the second subset of the plurality of aligned map datasets, wherein each of the second plurality of lateral offset histograms corresponds to one of the one or more common lane lines; and determine the fused map dataset based at least in part on the first plurality of lateral offset histograms and the second plurality of lateral offset histograms.

* * * * *